May 18, 1965     D. J. HART ET AL     3,184,728
NULL BALANCING INDICATOR
Filed March 26, 1962
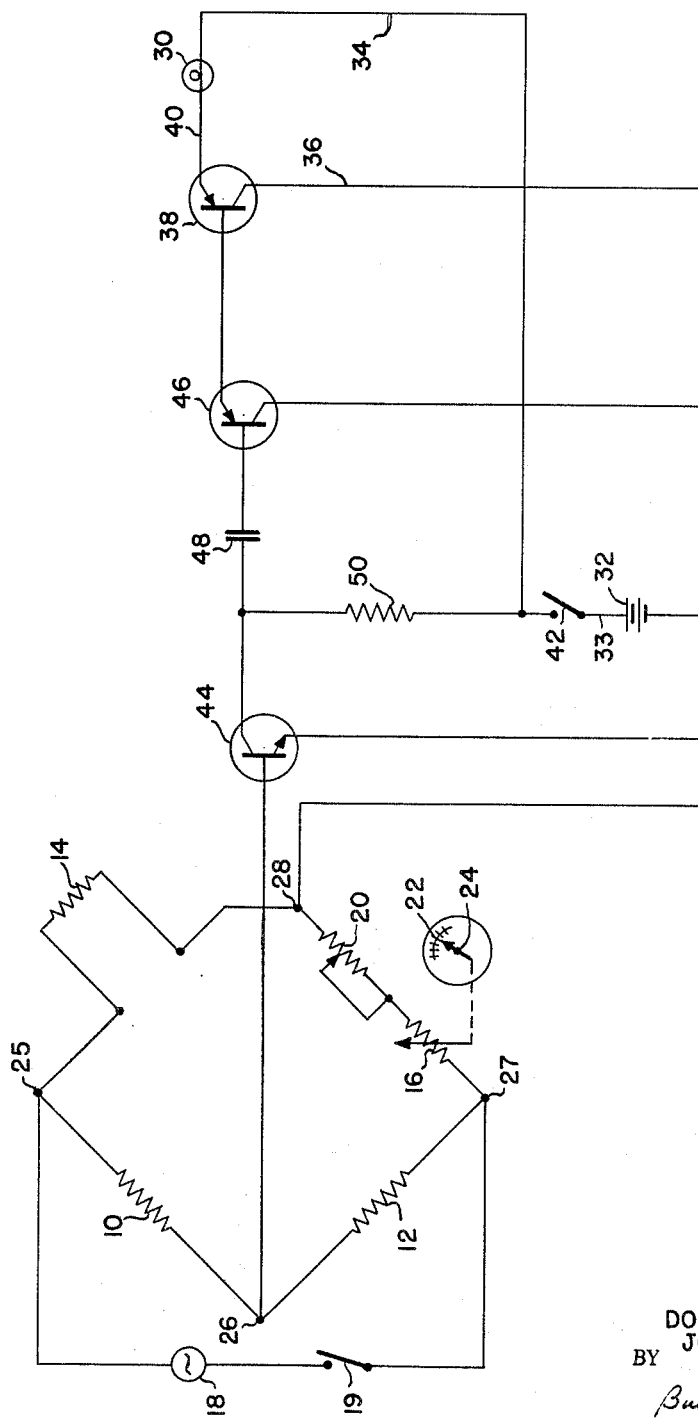
INVENTORS
DONALD J. HART &
BY JOSEPH JAFFE
Busser, Smith & Harding
ATTORNEYS

United States Patent Office 3,184,728
Patented May 18, 1965

3,184,728
NULL BALANCING INDICATOR
Donald J. Hart, Merion, and Joseph Jaffe, Gladwyne, Pa., assignors to Smith Kline & French Laboratories, Philadelphia, Pa., a corporation of Pennsylvania
Filed Mar. 26, 1962, Ser. No. 182,206
7 Claims. (Cl. 340—233)

The present invention relates to the art of temperature measurement and more particularly to new and improved means for indicating when a null or balanced condition is reached in a thermistor bridge circuit.

The use of electrical thermometers utilizing a thermistor as the temperature responsive element has recently become practical for measuring the temperature of a patient within more accurate limits and more rapidly than was heretofore possible with other types of thermometers. Such electrical thermometers normally include a Wheatstone bridge containing two fixed resistors, a thermistor and a variable resistor which is adjusted until it balances the resistance of the thermistor. Since the resistance of the thermistor varies with temperature, the position of the movable element of the variable resistor provides an extremely accurate measurement of temperature. However, prior to this invention, such electrical thermometers have been subject to several drawbacks imposed by the use of galvanometers to indicate when this balanced condition is reached since galvanometers are extremely delicate and subject to variation upon the incident shocks occurring during normal use of the thermometer. In addition, it has proven difficult to accurately ascertain when the precise instant of balance is reached. That is, as the galvanometer needle gradually approaches a zero reading, it is virtually impossible to determine the exact zero position due to parallax and transient variations caused by changes in external magnetic fields which often occur due to the operation of surrounding equipment.

The present invention provides a solution to these drawbacks and thereby makes the use of electrical thermometers more practical. This is accomplished by eliminating the galvanometer and providing a flashing light indicator which ceases to flash at the precise setting of the variable resistor which establishes the balanced bridge condition.

It is therefore a general object of the invention to provide a new and improved thermistor circuit for measuring temperature.

It is a further object to provide simpler and more accurate means for indicating a balanced condition of a Wheatstone bridge.

It is yet another object of the invention to provide a flashing visual indicator for determining the precise instant at which an electrical circuit is balanced.

These objects, as well as others pertaining to the particular details of construction, will become more fully apparent from the following description when read in conjunction with the accompanying drawing wherein the drawing is a schematic diagram of the thermistor circuit in conjunction with a transistorized circuit for controlling the flashing of a light indicator.

Referring first to the left hand portion of the drawing, there is illustrated a thermistor bridge circuit which includes two fixed resistors 10, 12, a thermistor 14 and a variable resistance 16, each resistance forming one leg of a Wheatstone bridge. The bridge is supplied with a variable signal from generator 18 which may be a sawtooth or squarewave oscillator or pulse generator which is capable of producing a variable signal having a frequency in the range of five to seven cycles per second. Although other frequencies may obviously be employed, the five to seven cps. range is preferred for reasons which will become more fully apparent hereinafter.

The bridge circuit also includes a switch 19 and a second variable resistance 20 the latter of which is used to initially calibrate the bridge. The movable element of resistor 16 is connected to move indicator 24 across scale 22, the latter of which is calibrated in temperature units so that the device reads out directly in terms of temperature. Of course, it is to be understood that, in practice, indicator 24 or scale 22 may be connected to the movable element of the resistor and that either the indicator or the scale may be manipulated relative to the other so as to vary the position of the resistor element. For example, indicator 24 may be a stationary mark on a casing enclosing the circuitry and scale 22 may comprise marks on a rotatable dial, the latter being structurally connected to vary the position of the resistor element.

As stated hereinabove, the prior art has relied upon the use of a galvanometer connected across terminals 26 and 28 to indicate when the bridge was balanced. The present invention eliminates the galvanometer and utilizes the transistor circuitry illustrated in the right hand portion of the figure. This circuit includes a miniature bulb 30 which is connected across battery 32 through leads 33, 34, 40, the emitter and collector of transistor 38 and lead 36. Thus, so long as switch 42 is closed, bulb 30 will be illuminated at a constant intensity thereby indicating the operative condition of the circuit.

In the preferred embodiment illustrated in the figure, an NPN type transistor 44 is utilized to amplify the unbalanced condition of the bridge circuit between terminals 26, 28 and two PNP type transistors 46, 38 are employed to achieve the proper impedance matching between bulb 30 and the bridge circuit. Transistor 44 is connected in the common-emitter configuration, whereas, transistors 46 and 38 are connected in the common-collector configuration. A capacitor 48 and a biasing resistor 50 are connected to the emitter of transistor 44 so as to establish a capacitive coupling between the amplifier 44 and the load 30. Of course, it will be readily understood that transistors 46 and 38 may be replaced by a single transistor having an appropriate impedance matching value and that a grown transistor could be utilized to replace all three of the transistors which are shown separately in order to facilitate the description of the circuit.

In order to calibrate the instrument, switch 19 is closed and generator 18 supplies a variable signal to the bridge across terminals 25–27. This signal is then adjusted to fall in the five to seven cycle per second range, whereupon, variable resistor 20 is adjusted in order to calibrate the bridge circuit with respect to the scale 22. Once the bridge has been initially calibrated, the thermometer may be used over extended periods of time without recalibration due to the extreme stability of the disclosed circuitry as contrasted to that which results from the use of a shock-sensitive galvanometer.

When it is desired to use the disclosed structure for measuring a patient's temperature, thermistor 14 is appropriately placed in or on the body in accordance with customary procedures, whereupon, switches 19 and 42 are closed. Again, generator 18 supplies a variable signal across terminals 25–27 and the voltage differential between terminals 26 and 28 is applied to the base of transistor 44. This voltage is amplified and supplied through capacitor 48, transistor 46 and transistor 38 to bulb 30 which increases and decreases in intensity in response to the frequency of the signal applied to terminals 25 and 27. Since the human eye is most sensitive to frequencies in the range of five to seven cps., these frequencies are to be preferred in the practice of the invention. Thus, so long as the bridge remains in an unbalanced condition, bulb 30 continues to vary in intensity at the foregoing frequency. However, when resistor 16 is set such that it balances the bridge voltage across terminals 26–28, bulb 30 ceases to vary in intensity but remains illuminated at a constant intensity due to the constant voltage supplied by battery 32. Thus, the precise setting of resistor 16 is accurately indicated by the steady state of bulb 30 and the temperature is read from scale 22 as indicated by indicator 24. At this point it should be realized that the human eye is much more sensitive to flashing or flickering light than it is to a gradual change in the intensity of light. The present invention utilizes this extreme sensitivity of the eye in providing a flashing bulb rather than one which gradually decreases in intensity as the balanced condition is approached and which goes out when the balance is achieved. Furthermore, if the bulb were to go out, it would not differentiate between a balanced condition and a defect in the circuit. In addition, the use of a gradually diminishing light makes it extremely difficult to determine the exact setting at which the bulb is completely out. Thus, the flashing and continuously illuminating features are to be considered as forming essential aspects of the present invention.

While it is obvious that the values of the various components are subject to an infinite variation, the following values have been noted to be preferred in the design of a practical circuit. Battery 32 is chosen to have a value of 1.5 volts, resistor 50 having a value of 33K and capacitor 48 having a capacitance of 10 f. With these values, bulb 30 may have a resistance in the order of 23 ohms and transistor 44 will produce a gain of 500 which is more than sufficient to give an easily discernible flashing of bulb 30.

Of course, the foregoing description is intended to be merely illustrative of a preferred embodiment and numerous modifications will be readily apparent. For example, transistor 44 may be replaced by a PNP type transistor if a second battery is added to the bulb circuit, the latter supplying the steady state voltage to the lamp and battery 32 acting as the bias for the amplifying transistor. Accordingly, the invention is to be understood to be limited only as specifically set forth in the following claims.

What is claimed is:

1. A circuit containing a Wheatstone bridge, said bridge including means providing a resistance the magnitude of which varies in response to variations in temperature and a variable resistor for balancing said bridge, a signal generator for supplying a signal of a predetermined frequency across said bridge, illuminating means connected to said bridge so as to vary in intensity at said predetermined frequency only so long as said bridge is unbalanced, said frequency being such that the variations of intensity of said illuminating means are detectable by the human eye, and means for illuminating said illuminating means at constant intensity when said bridge is balanced by said variable resistor.

2. The circuit as claimed in claim 1 wherein the first recited means comprises a thermistor.

3. An indicator for indicating an electrically balanced condition between two points in a first circuit comprising, a generator applying a variable voltage signal to said first circuit, illuminating means, a second circuit for sensing the presence of a potential difference between said points and supplying a signal proportional thereto to said illuminating means only so long as said potential difference is present between said points, the signal supplied to said illuminating means having a frequency such that said illuminating means vary in intensity at a visible frequency, and an additional signal source for illuminating said illuminating means at a constant intensity when said points are electrically balanced.

4. A temperature measuring system comprising a Wheatstone bridge, said bridge including means providing a resistance the magnitude of which varies in response to variations of a sensed temperature and a manually adjustable resistor for balancing said bridge, means calibrated in temperature measuring units connected to said manually adjustable resistor, a signal generator supplying a signal of a predetermined frequency across said bridge, a lamp, means connecting said lamp to said bridge so as to vary in intensity at a rate detectable by the human eye only so long as said bridge is unbalanced whereby said lamp ceases to vary in intensity at said rate when said manually adjustable resistor is adjusted to balance said bridge in which condition said calibrated means indicates the magnitude of said sensed temperature and a second signal source connected to said lamp so as to illuminate said lamp at a constant intensity when said bridge is balanced.

5. The system as claimed in claim 4 wherein said first recited means comprises a thermistor.

6. The system as claimed in claim 4 wherein said means providing a resistance the magnitude of which is proportional to a sensed temperature comprises a thermistor.

7. The system as claimed in claim 4 wherein said means connecting said lamp to said bridge includes an amplifying means.

References Cited by the Examiner

UNITED STATES PATENTS

| | | | |
|---|---|---|---|
| 1,537,281 | 5/25 | Wunsch. | |
| 2,781,505 | 2/57 | Grant | 340—233 |
| 2,991,653 | 7/61 | Thompson | 323—75 X |
| 3,040,157 | 6/62 | Hukee. | |

NEIL C. READ, *Primary Examiner.*